No. 653,101

UNITED STATES PATENT OFFICE.

ALBERT M. LENNIG, OF JACKSONVILLE, FLORIDA, ASSIGNOR, BY MESNE ASSIGNMENTS, TO CLARENCE S. HAMMATT, OF SAME PLACE.

WOOD-FILLER COMPOSITION.

SPECIFICATION forming part of Letters Patent No. 653,101, dated July 3, 1900.

Application filed August 7, 1899. Serial No. 726,461. (No specimens.)

*To all whom it may concern:*

Be it known that I, ALBERT M. LENNIG, a citizen of the United States, residing at Jacksonville, in the county of Duval and State of Florida, have invented certain new and useful Improvements in Fillers for Wood, Plaster, &c.; and I do declare the following to be a full, clear, and exact description of the invention, such as will enable others skilled in the art to which it appertains to make and use the same.

One object of my invention is to provide an improved filler for woods, plaster, cement, and other materials or bodies to which said filler is applicable or to the surface of which it is desired to apply the same and by the proper application or utilization of my improved filler to produce a smooth, durable, and finished surface.

A further object is to provide a filler that will not raise the grain of the wood, that will be much less combustible than those ordinarily employed, and will serve as a preservative.

In order to carry out my invention, I take one gallon of a gummy extract of palmetto—that is, gum extracted from palmetto—one-fourth pound of dextrine, one pint of commercial silicate of soda of the best grade, one-fourth pound of silex, quartz, feldspar, fuller's earth, or similar substance finely ground or pulverized, and one-half gallon of distilled water. After the aforesaid ingredients shall have been properly or suitably mixed the product is ready for use, and a single coat will prove sufficient to produce an unusually-smooth and durable surface.

By the foregoing it will be observed that the principal ingredient or base employed is gum extracted from palmetto. Hence a filler for wood is produced mainly from a wood-gum.

It will be understood that I do not confine myself to the exact proportions above stated, as I may depart in various ways from the proportions named and yet attain the objects desired.

The palmetto-gum, which constitutes the base of the composition, being a purely vegetable product will not rot or decay, as do animal products, and the woody character of the gum renders it valuable as a preservative of wood.

The preparation may be packed in any suitable or desirable manner and can be readily handled and utilized by any one skilled in the art.

Having thus described my invention, what I claim as new, and desire to secure by Letters Patent, is—

The herein-described filler composition, consisting of gum extracted from palmetto; dextrine; soda silicate; powdered silex; and distilled water, combined in substantially the proportions specified.

In testimony whereof I affix my signature in presence of two witnesses.

ALBERT M. LENNIG.

Witnesses:
C. S. HAMMATT,
FRANK D. BLACKISTONE.